Figure 1:
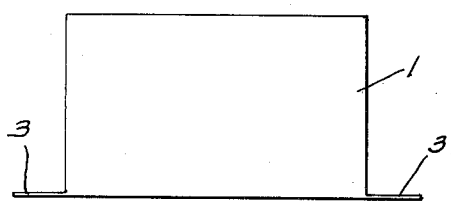

April 9, 1946.　　C. J. CAVALLITO　　2,398,082

COOKING AND PACKAGING

Original Filed May 3, 1941

Inventor
Chester J. Cavallito
Attorney

Patented Apr. 9, 1946

2,398,082

UNITED STATES PATENT OFFICE 2,398,082

COOKING AND PACKAGING

Chester J. Cavallito, Rensselaer, N. Y., assignor to Wingfoot Corporation, Akron, Ohio, a corporation of Delaware Original application May 3, 1941, Serial No. 391,749. Divided and this application October 1, 1943, Serial No. 504,540

1 Claim. (Cl. 99—182)

This invention relates to cooking and packaging foodstuffs in containers of rubber hydrochloride. It includes cooking fruits, vegetables, meats, etc., in water and other juices and cooking soups, jellies, and other aqueous preparations. It includes, also, the treatment of foodstuffs by other cooking operations, such as the cooking of meats, etc., in the absence of sufficient water to boil them. A treatment particularly suited to acid foodstuffs is included.

Various types of containers may be used in carrying out this invention. The container may be made of rubber hydrochloride film. Film of any heat-sealable thermoplastic which is stable at temperatures up to approximately 150° F. may be used, including esters and ethers of cellulose and synthetic materials, such as polymerized vinyl chlorides and other polyvinyl derivatives, methyl methacrylate, etc.

The process may, for example, be carried out in a bag of the envelope type or a square-bottomed bag or a bag with plicated sides, etc. Suitably lined cartons or cans of fiber or paperboard (with ends of metal or fiber or paperboard) may be used. A single-ply or multi-ply bag or liner may be used as, for example, a duplex bag. If more than one ply of material is used in the bag, the inner ply will be rubber hydrochloride or other suitable thermoplastic material, and the other ply or plies may be rubber hydrochloride or some other thermoplastic or a material such as paper, Cellophane, etc. The packages which may be used include bags, cartons or cans, etc., made from paper to which a film of rubber hydrochloride or other suitable thermoplastic has been laminated or spot glued, with the rubber hydrochloride on the interior of the bag in contact with the foodstuff.

The packages employed will not withstand great differences in pressure. The invention is applicable to cooking in any package which will burst when subjected to a relative internal pressure of up to ten pounds per square inch.

The invention includes the preheating of foodstuffs prior to introducing them into the package. It includes the cooking of foodstuffs in the package. It also includes, more particularly, the cooking of the various foodstuffs and classes of foodstuffs referred to herein and the particular methods herein disclosed.

The present invention relates to cooking foodstuffs, such as meats, vegetables, and the like, in a bag or other container of rubber hydrochloride or other suitable thermoplastic in a pressure vessel and then cooling the container and contents while still under pressure to prevent bursting of the container. Any suitable means for cooling the container may be employed. After cooling, the container is removed from the pressure vessel.

The container advantageously may be placed in some rigid shell, such as a metal box with a slip cover on it to preserve the shape of the container during the cooking. The pressure vessel in which the package of foodstuff is cooked may be heated externally, and the gas within the vessel may be steam or hot air. The container is heated to sterilize and cook the foodstuff. The foodstuff may be precooked before it is put into the rubber hydrochloride container, or it may be put into the rubber hydrochloride container in an uncooked condition. Vegetables, etc., may be washed before being packaged and cooked. Necessary water is added to the package together with salt or sugar or other seasoning, etc.

The pressure vessel may be of any suitable shape. It may be cylindrical and open at one or both ends. The packages are introduced into the vessel on appropriate trays or shelves. The packages may be at a slightly elevated temperature when placed in the vessel, or they may be introduced cold. The doors of the vessel are then tightly closed, and the vessel is heated until its contents reach a temperature of about 240–250° F.

After cooking and before removing the packages from the pressure vessel, it is necessary that the packages be cooled under pressure to a temperature at which they will not be ruptured by the pressure developed within them. Therefore, while the packages are still in the vessel and while the necessary pressure is maintained within the vessel, the vessel is cooled internally with a cold fluid, such as air or other gas or a vapor or a liquid, and in some suitable manner the packages are cooled to a temperature at which the pressure within is not greatly above atmospheric. It may be reduced to atmospheric. Often the cooking produces gases or vapors which exert a slight pressure within the package even though it is cooled below the boiling point of water. The containers must be strong enough to stand such slight pressures.

For example, after cooking and while the vessel is still under approximately the pressure used in cooking, cold air may be introduced into the vessel to cool it and to cool the packages. The pressure within the vessel may be gradually reduced as the cooling proceeds. If the packages contain soup or a stew or other foodstuff which contains a large amount of water, the vessel and packages will be cooled somewhat below the boiling point of water before reducing the pressure within the vessel because even at temperatures of 205° and 210° F. the contents of such packages exert a considerable vapor pressure.

Figure 5:
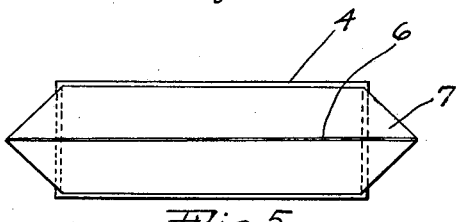
Figure 6:
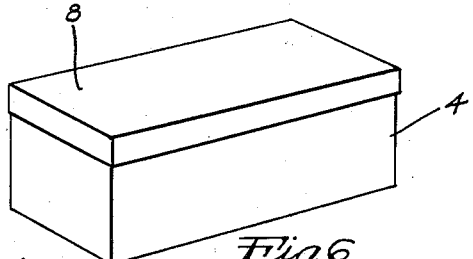
Figure 7:
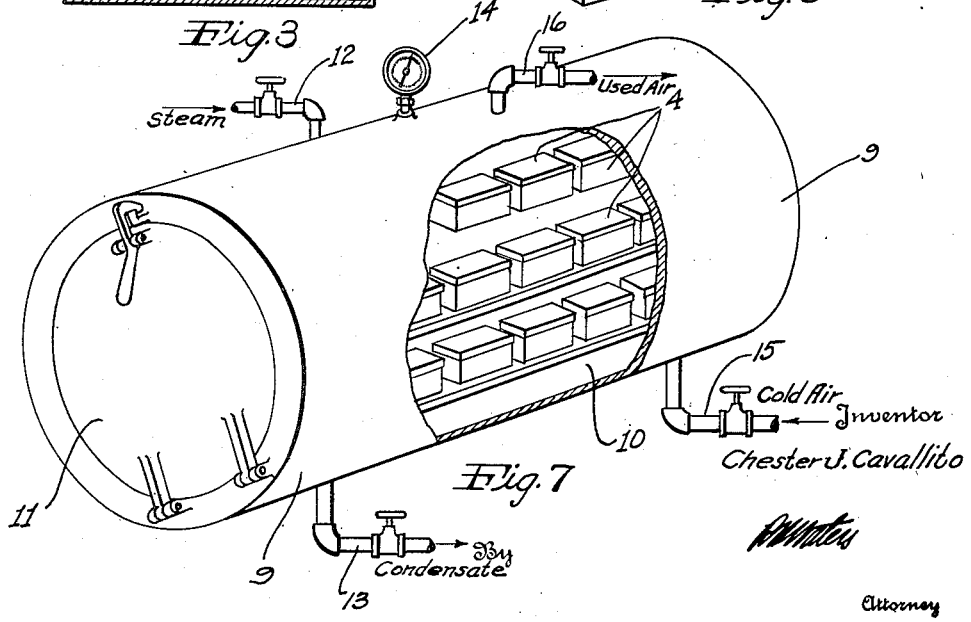

The invention will be further described in connection with the accompanying drawing, in which Figs. 1 to 6 show different stages in the production of a certain rubber hydrochloride package which may be used in carrying out the invention. Fig. 7 shows a pressure cooker partly in section.

Figure 4:
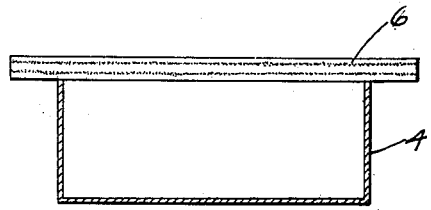
Figure 2:
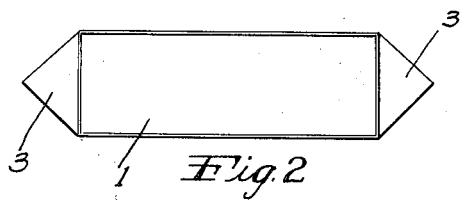
Figure 3:
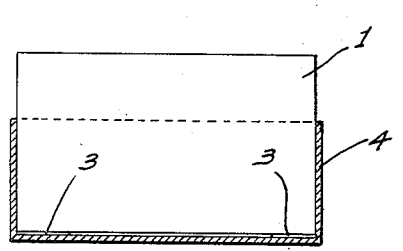

The package may, for example, be made from a flat bag formed from a sheet of film which is folded across the middle and sealed up the two open ends or from two sheets which are sealed on three sides. In order to fit it into a rectangular container, such a film is blocked out at the bottom. This leaves triangular ears at each end. Fig. 1 is a side view of a bag after it is so blocked out, and Fig. 2 is a plan view. Fig. 3 shows the bag inside a metal box. Figs. 4 and 5 are an elevation and plan view, respectively, of the bag in the box after sealing. Fig. 6 shows a covered rigid metal box with the completed rubber hydrochloride package inside of it.

The bag of Fig. 1 may be made of a single ply of rubber hydrochloride film which is not laminated to any other material. It may be an unplasticized film although it is ordinarily advantageous to use a plasticized film when there is no danger of contamination of the contents from the plasticized bag. The film may be unstabilized, or it may contain a light inhibitor, such as, for example, hexamethylene tetramine, if this does not contaminate the foodstuff.

When the flat envelope of rubber hydrochloride film is blocked up to form the bag 1, as shown in Figs. 1 and 2, triangular ears 3 are formed at each end of it. When this bag is placed into the form-retaining metal container 4, the ears 3 may be folded under, as shown, or they may be folded up along the sides of the container.

The box 4 is not a pressure vessel. Its main purpose is to maintain the shape of the package. The rubber hydrochloride and other thermoplastics soften when heated. Packages of regular shape are more merchantable than packages of irregular shape, and this is the chief reason for putting the bag in a box during the cooking. Instead of making the box of metal, it may be made of a thermo-set plastic or any suitable material. A metal box is preferred because of its higher heat conductivity.

The foodstuff is advantageously introduced into the bag after it has been blocked up and inserted in the box 4, as shown in Fig. 3. The foodstuff may be partially precooked and introduced into the bag hot, or it may be introduced uncooked, hot or cold.

The foodstuffs which may be cooked in this way include vegetables (such as peas, beans, beets, corn, tomatoes, etc.), fruits, meats (for example, in the form of stews, meat loaves, etc.), soups, seafoods, juices, and various specialties, such as jellies, puddings, spaghetti, etc.

When filled, the bag is closed with an airtight seal. This is preferably done by inserting fingers at each end of the bag and spreading the top of the bag over the ends of the box 4 and thus bringing the top edges of the bag into contact without and reentrant folds and then uniting the contacting surfaces with heat under pressure. In this way a seam, such as the seam 6, is formed. Adhesive may be used for closing the bag although, preferably, the bag will be sealed by the application of heat and pressure. The dotted lines in Fig. 4 indicate areas which have been heat-sealed together.

The sealed flange 6 is now folded down, and the ears 7 are folded over the top of the package, and the top of the container 8 is then placed on the box 4, and the package is ready for cooking in the pressure container. The cover fits loosely. It may be omitted.

A double-walled or duplex bag may be used to obtain greater strength than is possible with a single-walled bag. If both plies are of thermoplastic material, it may be desirable to separate the plies with a nonthermoplastic material to prevent their becoming united to one another when the bag is heated.

The packages are now placed in the pressure cooker. A large number of packages, preferably individually enclosed in some type of form-retaining container, such as the box 4, are cooked simultaneously. Fig. 7 shows a pressure cooker 9 equipped with racks on which the packages 4 are placed. The packages are preferably so arranged within the cooker that each package is separated from every other. This permits circulation of the heating and cooling gases and vapors around the individual packages.

The pressure cooker may contain heating coils or electrically heated units within the space 10 in which the packages are placed. For example, the racks on which the packages are placed may be heated internally.

After the packages are arranged within the pressure cooker, the door 11 is closed, and the heating fluid is admitted to the space 10 in which the packages have been placed. The fluid, which may, for example, be steam or hot air or even hot water or other liquid (depending upon the composition of the bag material and the nature of the package, etc.), is admitted to the vessel through the pipe 12. If heating means is located within the vessel, it may not be necessary to continue to introduce the heating fluid or liquid during the cooking operation. Ordinarily, heat will be supplied through the pipe 12 throughout at least the early portion of the cooking period. Steam under pressure will ordinarily be used for the cooking operation.

In order to use steam and at the same time keep the packages in the boxes 4 dry, it is advantageous, in placing the vessel under pressure, to first fill the vessel with air under approximately the same pressure as the steam which is to be later used for cooking. This fills any space within the packages with air under this pressure. The steam contacts the outer walls of the boxes 4, and, normally, some condensation will occur, and the condensate will collect on these outer walls. The pressure of the air within the boxes prevents or retards the entrance of steam into the boxes, at least during the early stages of the process when the boxes and contents are being heated to the desired temperature. Little, if any, condensate forms after the boxes, etc., are brought to temperature. In this way, the packages themselves may be kept fairly dry or entirely dry because little or no condensate forms within the boxes.

The condensate will be drawn off through the line 13. The temperature and time of cooking will depend upon the foodstuff being treated. The following table indicates appropriate processing conditions for an approximately one-pound package of the foodstuffs mentioned:

| Food class | Examples | Initial temp. | Processing temp. | Processing pressure | Total processing time |
|---|---|---|---|---|---|
| | | °F. | °F. | Pounds | Minutes |
| Acid | Tomatoes | 100-170 | 240 | 10.5 | 20 |
| | Pears | | 250 | 15 | 20 |
| | Jellies | 170 | 240 | 10.5 | 15-20 |
| Acidified nonacid | Artichokes | | 240 | 10.5 | 15-20 |
| Nonacid | Corn (kernel) with brine | 130 | 250 | 15 | 40 |
| | Meat products | 70-130 | 240-250 | 10-15 | 60-90 |
| | Soups | 130 | 240-250 | 10-15 | 20-50 |

By precooking, the time of cooking indicated above may, of course, be reduced. The time required will depend upon the temperature employed. The above figures are merely suggestive of what may be used. For example, although the above table indicates that about 20 minutes is required for cooking tomatoes, using a temperature as high as 240° F., the tomatoes may be precooked before being packaged and then cooked for only an additional 10 or 15 minutes at about 180-190° F.

After the foodstuff is cooked, if it contains steam or other vapors, it is necessary to keep the package under pressure until the vapor has been condensed. Returning the pressure vessel to atmospheric pressure immediately would cause the vapor pressure within the packages to burst the packages. According to this invention, the packages are cooled before they are removed from the pressure chamber of the cooker or before reducing the pressure within the cooker, and this is advantageously accomplished by circulating a cooling fluid under pressure around the individual packages. The cooling fluid may be cold air or water or other liquid, or a combination of a cooling gas and a cooling liquid may be used.

If steam is used for cooking, the exterior of the packages may become wet. Then, no added problem is introduced if water is used for cooling the packages. If the packages are dry while cooling, it may be preferable to use a gas. The gas must, of course, be maintained under sufficient pressure to prevent rupture of the packages. The cooling fluid may be introduced into the cooking vessel through the line 15 and exhausted through the line 16.

The packaging material, of course, has some strength and will withstand a slight difference in pressure between the outside and inside of the packages. However, it will not withstand any great internal pressure. It is, therefore, necessary, at least at the start of the cooling, to maintain the packages under some external pressure, preferably a pressure in excess of that generated within the packages by the steam developed therein. As the packages cool off, the external pressure may, of course, be reduced. When the packages are sufficiently cool, that is, when their contents have been reduced to at least below the boiling point, the pressure within the cooker may be released, and the packages may then be removed.

The packages are then ready for shipment. If steam or water or any other liquid has been used, it may be necessary to dry the packages before shipping them or before enclosing them in some suitable outside wrapper. The packages may, for example, be removed from the boxes 4 and dried in a current of air. They may then be inserted in individual cartons for shipment to the ultimate consumer. By keeping the packages enclosed in the boxes 4 during the heat treatment, their shape will be maintained and because of this it will be easier to insert the packages in cartons after completing the heat treatment.

Acid foodstuffs, such as tomatoes, fruits, etc., may be completely cooked before being placed in a bag or other container of rubber hydrochloride film or other thermoplastic material. They are then packaged while still so hot that they sterilize the inside of the container. Packaging such foodstuffs at a temperature of 180-190° F. is satisfactory for this purpose. Such foodstuff is hot enough to raise the interior of the container to the temperature required for sterilization. The opening of the bag or other container is then closed with an airtight seal, preferably a heat-seal, to keep the contents in a sterile condition. The container may be closed before the sterilization is complete.

This application is a division of my application Serial No. 391,749, filed May 3, 1941.

What I claim is:

The method of cooking under steam pressure a foodstuff enclosed in a sealed, flexible container of thermoplastic film so as to maintain the container substantially dry and prevent injury to the container from internal pressure created during cooking, which includes confining the sealed container in a rigid form-retaining receptacle pervious to fluid pressure and of heat conducting material and enclosing the receptacle with the container therein in a closed pressure cooker, preliminarily filling the cooker with air under pressure substantially the same as the pressure employed during cooking to cause the air to fill any spaces within the receptacle, thereby to prevent expansion of the container and prevent or retard steam condensation entering the receptacle and wetting of the container during subsequent steam cooking, then without substantial change in pressure replacing the air in the pressure cooker outside the receptacle with steam under pressure to cook the contents of the container, and following the completion of cooking replacing the steam in the cooker by a cooling fluid under pressure to cool the container, and maintaining the pressure until the internal pressure created in the container during cooking has been reduced sufficiently through cooling to permit removal of the container from the cooker and receptacle without strain or rupture of the container.

CHESTER J. CAVALLITO.